Feb. 9, 1943.  B. C. JOHNSON  2,310,906
EVAPORATOR
Filed June 19, 1939  3 Sheets-Sheet 1

Inventor
BERNARD C. JOHNSON.

Feb. 9, 1943.        B. C. JOHNSON        2,310,906
EVAPORATOR
Filed June 19, 1939        3 Sheets-Sheet 2
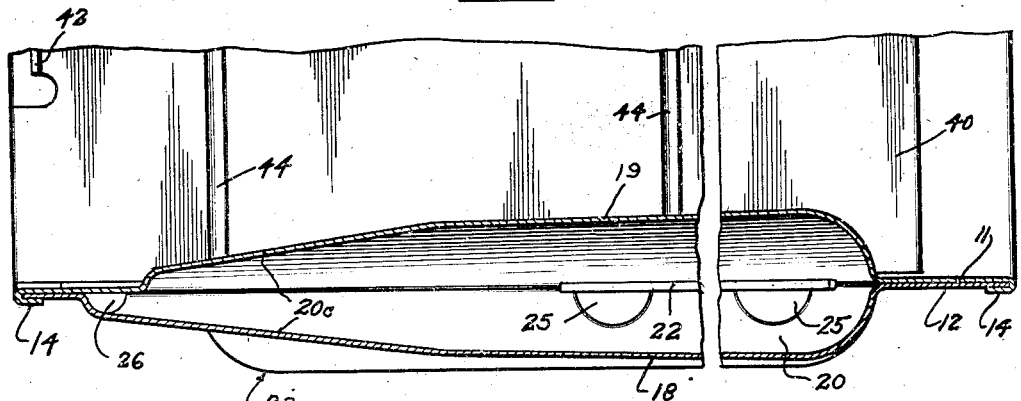
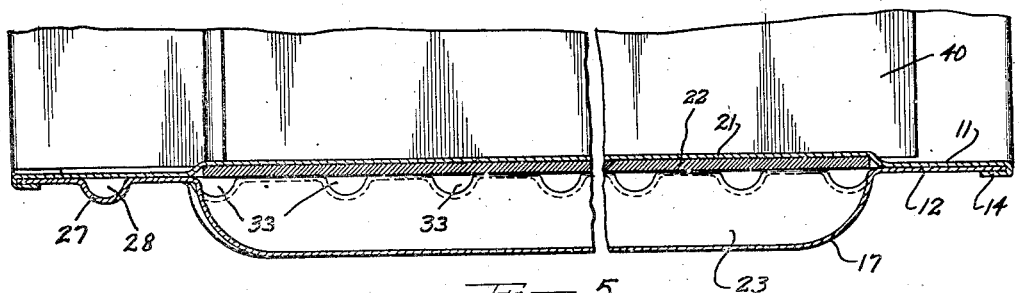
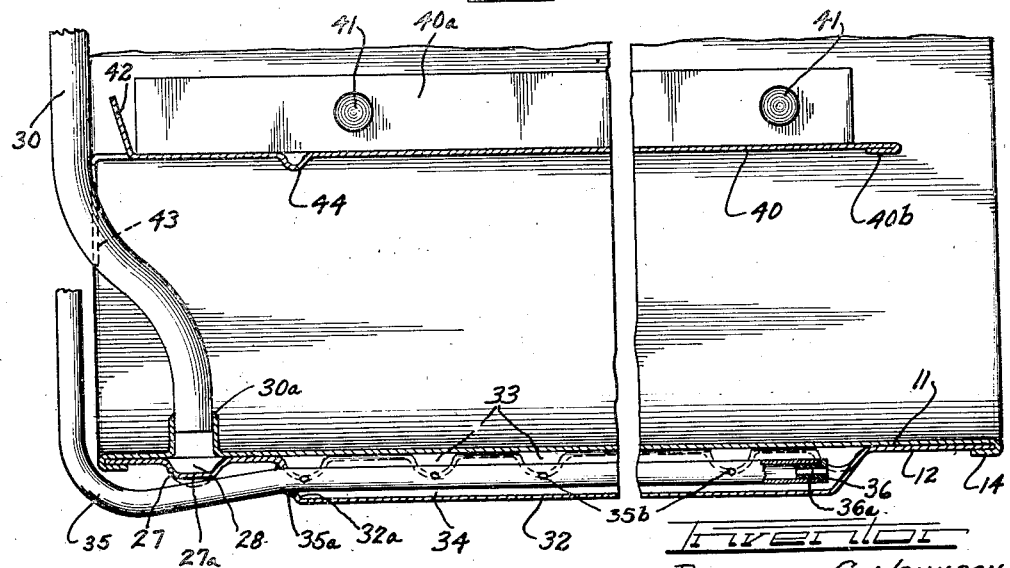
Inventor
BERNARD C. JOHNSON.

Feb. 9, 1943. B. C. JOHNSON 2,310,906
EVAPORATOR
Filed June 19, 1939 3 Sheets-Sheet 3
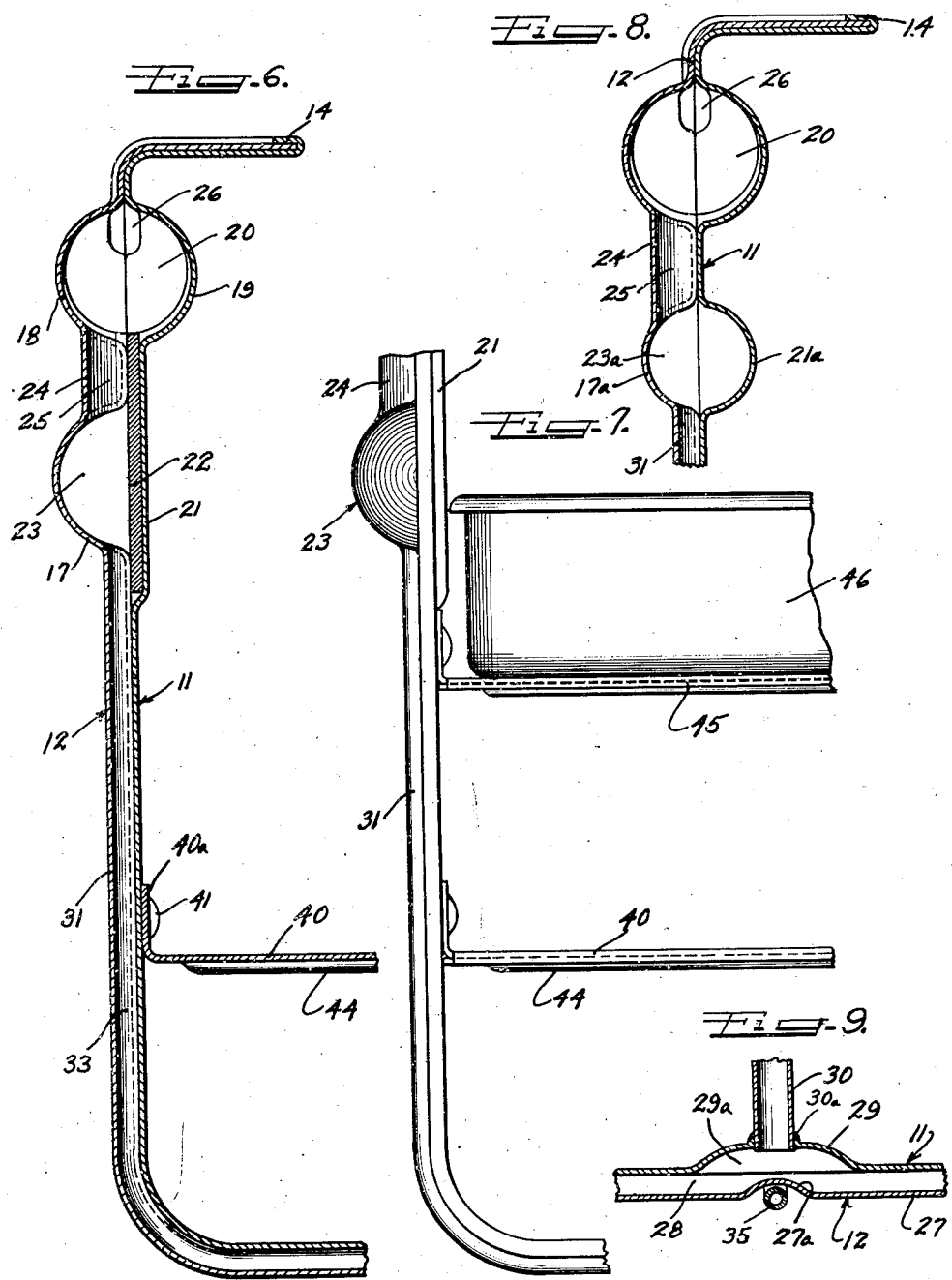
Inventor
BERNARD C. JOHNSON.

Patented Feb. 9, 1943

2,310,906

UNITED STATES PATENT OFFICE 2,310,906

EVAPORATOR

Bernard C. Johnson, Libertyville, Ill., assignor to Houdaille-Hershey Corporation, Detroit, Mich., a corporation of Michigan Application June 19, 1939, Serial No. 279,878

16 Claims. (Cl. 62—126)

This invention relates to heat exchangers fabricated from sheet metal.

More particularly the invention relates to evaporator units for refrigerators formed from stamped sheet metal to define a U-shaped member having a pair of superimposed headers on each side thereof connected together through passageways extending around the member.

According to this invention, a flat sheet of metal is stamped to provide a pair of header depressions extending across each end portion thereof and to provide longitudinal passageways connecting the headers. A transverse inlet passageway is also stamped in this sheet intermediate the ends thereof to intersect with the longitudinal passageways.

A feature of the invention includes the stamping of an outlet passageway in this sheet extending from the center of the sheet to the outermost headers. This stamped passageway eliminates the necessity for added pipes which heretofore have been soldered to the headers in an evaporator unit.

A second flat metal sheet is also provided and is stamped to form header depressions therein for complementary registration with the outermost header depressions of the first mentioned sheet. Reinforcing plate receiving depressions are also stamped in this second sheet of metal inwardly of the header depressions. Reinforcing plates are inserted in these plate-receiving depressions, a brazing shim is laid over either one of the sheets and the sheets are crimped together along their peripheral edges to form a pack with a brazing shim and a pair of reinforcing plates sandwiched therebetween. The pack is then heated in a brazing furnace to integrally join the sheets together along all contiguous surfaces thereof.

If desired, the brazing shim may be dispensed with and the sheets and plates secured together by spot welding, stitch welding or the like metal bonding operations.

The secured-together pack is then bent into a U-shape to form an evaporator unit having side walls and a bottom enclosing a sharp freezing chamber. The resulting evaporator unit has a pair of superimposed headers on each side wall thereof and U-shaped circulating chambers formed by the longitudinal passageways in the first sheet, placing the headers in communication. The first mentioned sheet forms the outer wall of the evaporator unit.

The reinforcing plates form back walls for the lower headers in the evaporator unit and resist bulging out of the inner sheet due to pressures that might develop in the system. The top headers need not be reinforced since they are cylindrical in shape. On the contrary the lower headers are only semi-cylindrical and are made in this form so as not to extend into the sharp freezing chamber to obstruct ice trays or the like.

Another feature of the invention resides in a sloping of the top headers relative to the bottom headers, and the exhausting of the top headers at the highest point remote from the bottom headers. This permits the draining back of any ungasified refrigerant into the bottom headers.

It is, then, an object of this invention to provide a sheet metal heat exchanger having inlet and outlet passageways stamped therein to eliminate the necessity for a plurality of soldered pipe or tube joints.

Another object of the invention is to provide a U-shaped evaporator unit formed from sheet metal and having a pair of superimposed headers on each side of the unit.

A further object of the invention is to provide an evaporator unit having a U-shaped circulating chamber and a pair of superimposed headers at each end of the chamber.

A further object of the invention is to provide, in an evaporator unit, a pair of superimposed intercommunicating headers diverging from each other for facilitating drainage from the top header back to the bottom header.

Another object of the invention is to provide a sheet metal evaporator unit having a segmental cylindrical header reinforced with a flat metal backing plate.

A further object of the invention is to provide sheet metal evaporator units having reinforcing plates inserted between the sheets.

Other and further objects of the invention will become apparent to those skilled in the art from the following detailed descriptions of the annexed sheets of drawings which disclose several embodiments of the invention.

On the drawings:

Figure 1 is a side elevational view of a sheet metal evaporator unit according to this invention;

Figure 2 is a front end elevational view of the evaporator shown in Figure 1;

Figure 3 is a greatly enlarged, broken, cross-sectional view taken along the line III—III of Figure 1;

Figure 4 is an enlarged broken cross-sectional view, taken along the line IV—IV of Figure 1;

Figure 5 is an enlarged broken cross-sectional view taken along the line V—V of Figure 2;

Figure 6 is an enlarged fragmentary cross-sectional view taken along the line VI—VI of Figure 1;

Figure 7 is a fragmentary front elevational view of a two-shelf evaporator unit according to this invention and illustrating the utility of providing a flat back wall on the lower headers for eliminating interference with ice trays mounted on the top shelf.

Figure 8 is a fragmentary vertical cross-sectional view taken through a side wall of a modified evaporator unit according to this invention and illustrating a full cylindrical lower header;

Figure 9 is an enlarged cross-sectional view taken along the line IX—IX of Figure 1.

As shown on the drawings:

In Figures 1 and 2 the reference numeral 10 designates generally an evaporator unit composed of an inner metal sheet 11 and an outer metal sheet 12. The evaporator unit 10 is U-shaped, as best shown in Figure 2, to define the side walls and bottom of a sharp freezing chamber 13.

The inner metal sheet 11 may be bent back around the peripheral edges of the outer metal sheet as shown at 14. All contiguous surfaces of the sheets 11 and 12 are brazed or welded together.

The side walls of the unit 10 may be bent at the tops thereof to form flanges 15. The flanges 15 can be apertured as at 16 for receiving suspension means therethrough to hang the evaporator unit in a refrigerator cabinet, preferably from the top wall of the cabinet.

The outer metal sheet 12 has semi-cylindrical superimposed header embossments 17 and 18 formed thereon near the top of each side wall of the unit. These header embossments 17 and 18 extend transversely across the width of the sheet 12 into spaced relation from the ends of the sheet as shown in Figure 1. Complementary header embossments 19 are also formed on the inner sheet 11 to register with the top header embossments 18 of the outer sheet and to form together cylindrical top headers 20 on each side wall of the unit 10.

As best shown in Figures 2, 4 and 6, rectangular embossed portions 21 are formed on the inner sheet 11 under each embossed portion 19. These embossed portions 21 form rectangular pockets extending in back of the lower header embossed portions 17 of the outer sheet. Metal reinforcing plates 22 are inserted in these pockets and form back walls for semi-cylindrical lower headers 23. These lower headers 23 do not extend into the sharp freezing chamber as do the top headers 20. The plates 22 reinforce the headers 23 and prevent a bulging of the inner sheet 11. As best shown in Figure 6, the plates 22 extend for some distance above and below the header 23.

Each pair of headers 20 and 23 are in intercommunication at two spaced points. The outer shell 12 has a pair of embossed portions 24 between each pair of headers 20 and 23 defining passageways 25 (Figures 3 and 6) joining the tops of the headers 23 with the bottoms of the headers 20.

As best shown in Figure 1, the bottom wall of each top header 20 diverges upwardly from the top wall of each header 23 in a direction toward the rear of the evaporator unit. Thus the bottoms 20a of the top headers 20 slope toward the front of the evaporator unit and the rear passageways 25 connecting the headers must be longer than the front passageways 25.

The rearmost ends of the bottom walls 20a of the top headers 20 diverge upwardly from the headers 23 at a more acute angle, as shown at 20b. As shown in Figure 3, the side walls of the top headers 20 also converge inwardly at the rear ends of the headers as at 20c. Apex outlets 26 are formed at the points of convergence of the bottom walls 20b and side walls 20c of the top headers 20. These outlets 26, as best shown in Figure 1, are at the tops of the headers 20 beyond the rear ends of the headers 23.

The outer sheet 12 is further embossed as at 27 to provide a passageway 28 (Figures 1 and 9) extending down the side walls of the unit and across the bottom of the unit to join each outlet 26.

As best shown in Figures 2 and 9, the inner shell 11 has a domed portion 29 in the middle of the bottom of the unit at the rear end of the unit. This domed portion 29 defines a chamber 29a communicating with the passageway 28 at a point substantially mid-distant between the outlets 26.

An outlet tube 30 has an end thereof soldered in the apex of the dome portion 29 as at 30a (Figures 5 and 9).

The embossed flute 27 on the outer shell 12 eliminates the necessity for a plurality of tubes and soldered connections for placing the headers 20 in intercommunication. A single tube and a single soldered connection is all that is necessary in this construction since the sheet metal itself has been formed to provide the necessary connection between the top headers.

As shown in Figures 1 and 2, a plurality of spaced parallel flutes 31 are embossed in the outer sheet 12 and extend from the bottoms of the headers 23 to a transverse flute 32 formed on the outer shell 12 at the center of the bottom of the unit. The flutes 31 provide refrigerant passageways 33 (Figures 4 and 5) joining the bottoms of the headers 23 with a transverse passageway 34 formed by the flute 32.

As shown in Figure 5 an inlet tube 35 extends through the rear end wall 32a of the flute 32 to the front end of the passageway 34. The end of the tube 35 at the front end of the passageway can have an apertured plug 36 therein providing a nozzle outlet 36a. The tube 35 has holes 35b therethrough at spaced intervals along its length in the passageway 34. The holes 35b extend transversely through the tube in a horizontal plane and are aligned with each duct 33 or with alternate ducts 33. Refrigerant is ejected through the nozzle 36a and the holes 35b into the passageway 34 and ducts 33. As shown in Figures 5 and 9, the flute 27 can be indented as at 27a to permit passage of the tube 35 thereunder without necessitating a sharp bend in the tube. This recessed portion 27a will also hold the tube against lateral displacement.

A single soldered joint 35a is all that is necessary to place the single inlet tube 35 in communication with all of the refrigerant circulating ducts 33 since refrigerant will flow out of the holes and nozzle end of the tube into the passageway 34 and from this passageway will be distributed to each of the passageways 33.

As shown in Figure 2 the top ends of the outlet and inlet tubes 30 and 35 can be pinched or crimped as at 37 and 38 respectively to seal the outer ends of the tubes for shipping purposes. In addition, the inlet tube 35 can have a reduced neck portion 35b for centering a capillary inlet tube if the same is to be used in a particular refrigerator system. If the reduced portion 35b is not to be used, the same can be cut off.

As best shown in Figure 1, the embossed portions 24 between the headers 20 and 23 are preferably misaligned from the ends of the flutes 31 so that gas forced slugs of liquid refrigerant issuing from the passageways 33 will not pass directly through the passageways 25 but, on the other hand, will splash against the top walls of the headers 23.

As shown in Figures 2 to 6, the evaporator unit 10 can have a bottom shelf 40 mounted in the sharp freezing chamber 13 thereof in spaced relation from the bottom of the chamber. The shelf 40 has upturned side flanges 40a in intimate contact with the side walls of the evaporator unit throughout substantially the entire length of the shelf. Rivets or lugs 41 unite the flanges 40a to the side walls of the evaporator unit. If desired, the flanges can be soldered or welded to the side walls.

As best shown in Figure 2, the rear edge of the shelf 40 has an upturned flange 42 on each side of the tubes 30 and 35. These upturned flanges 42 serve as stops for ice trays to be slidably mounted on the shelf. An intermediate downturned flange 43 is also provided at the rear end of the shelf 40 between the flanges 40 and 42. This downward flange 43 will act as a stop for ice trays or other material slid on the bottom wall of the unit under the shelf 40. The central portion of the flange 43 is cut out as at 43a to receive the outlet tube 30. As shown in Figure 5, the outlet tube 30 is offset to extend from a position inside of the sharp-freezing chamber to a position behind the evaporator unit. The offset portion of the tube extends through the slot 43a of the flange 43.

The front edge of the shelf 40 can have a crimped flange 40b bent thereunder to eliminate a sharp edge, (Figure 5).

Since the flanges 40a of the shelf 40 provide intimate thermal contact with the side walls of the evaporator unit, the shelf will be cooled to rapidly freeze ice in trays mounted on the shelf. If desired, transverse beads 44 can be embossed at intervals across the shelf 40 to rigidify the same.

As shown in Figure 7, a second shelf 45 substantially identical with the shelf 40 can be provided in spaced relation above the shelf 40 for supporting additional ice trays such as 46. The flat rear wall of the lower header 23 made possible by the reinforcing plate 22 in the pocket 21 eliminates interference with the ice tray 46 such as would be encountered if the header 23 had a full cylindrical contour.

As shown in Figure 8, however, the lower header can be made with a full cylindrical contour to eliminate the reinforcing plate 22. As shown in Figure 8, the lower header 23a is formed from an embossed portion 17a on the outer sheet 12 and a complementary embossed portion 21a on the inner sheet 11. The resulting cylindrical header need not be reinforced since the inner wall thereof is in cylindrical shape and pressures developed in the system will not further bulge the same. The construction shown in Figure 8 is suitable whenever the obstructions provided by the embossed portions 21a are not important. The embossed portion 17a defining the outer face of the header 23a can be smaller than the embossed portion 17 so that the total volume of the full cylindrical header will be the same as the total volume of the semi-cylindrical header 23.

The evaporator units of this invention receive condensed refrigerant from the inlet tube 35. This refrigerant is distributed by the passageway 34 through the U-shaped refrigerant circulating ducts 33 and into the bottom headers on each side wall of the unit. The refrigerant can gasify and boil off from the headers through the passageway 25 into the top headers 20. Any slugs of liquid refrigerant entering the top headers 20 will tend to drain by gravity back to the bottom headers 23 since the bottom walls of the top headers slope toward the bottom headers.

In addition, the converging conical outlet ends provided on the top headers act as chokes impeding flow of slugs of liquid refrigerant to the outlets 26. If, because of explosive violence of refrigerant ebullition, a slug of liquid refrigerant passes through the outlets 26, said slug has a chance to gasify during its travel through the outlet duct 28 since this duct is formed integrally in the evaporator unit and therefore has a radiating surface. Therefore, by the time the refrigerant approaches the outlet tube 30 it has had an opportunity to spend itself in evaporation, reducing, in this fashion, the possibility of reaching the compressor unit in the liquid phase.

The evaporator units of this invention eliminate many of the heretofore necessary solder joints since inlet and outlet ducts are formed integrally in the sheet metal defining the evaporator unit. The evaporator units are highly efficient since the refrigerant is completely spent before it leaves the unit.

Furthermore, refrigerant is introduced into the unit at points where it must travel for equal distances before reaching the headers. By locating the headers on opposite sides of the unit and by removing spent refrigerant through passageways of equal length connecting the top headers on each side with the exhaust tube, pressures in the headers must be equal. Therefore, refrigerant will flow to the headers and from the headers under balanced pressures on both sides of the unit. As a result, the units of this invention have efficiently balanced heat-absorbing capacities on both sides thereof.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. An open ended sheet metal evaporator unit comprising secured-together contiguous metal sheets defining the side walls and bottom of a sharp freezing chamber, at least one of said sheets being embossed to define a header chamber in each side wall, and at least one of said sheets being embossed to define a spent refrigerant outlet passageway along the side walls and bottom of the unit connecting the tops of the header chambers.

2. A sheet metal evaporator unit comprising a pair of secured-together contiguous metal sheets defining the side walls and bottom of a sharp freezing chamber, at least one of said sheets being embossed to define a header chamber in each side wall, and at least one of said sheets being embossed to define a passageway along the side walls and bottom communicating with the tops of the header chambers, and a single exhaust tube communicating with said passageway at said bottom.

3. A sheet metal evaporator unit comprising a pair of secured-together contiguous metal sheets defining the side walls and bottom of a sharp freezing chamber, said sheets being embossed to define a pair of superimposed header chambers in each side wall, at least one of said sheets being further embossed to define a passageway joining the tops of each top header chamber, and a single exhaust tube communicating with said passageway.

4. A sheet metal evaporator unit comprising a pair of secured-together contiguous U-shaped metal sheets, said sheets being embossed to define a pair of superimposed intercommunicating header chambers extending transversely along each leg of the U-shaped member, said outer sheet being further embossed to define a plurality of spaced parallel refrigerant circulating ducts connecting the lower header chambers of each pair, and at least one of said sheets being further embossed to define a spent refrigerant outlet passageway connecting the tops of the top header chambers of each pair.

5. An evaporator unit comprising inner and outer contiguous U-shaped metal sheets having embossed portions defining U-shaped refrigerant circulating ducts and a pair of transverse superimposed header chambers at each end of said ducts, said outer sheet being further embossed to define a manifold passageway connecting all of said ducts at the bottom of the U, said outer sheet having an additional U-shaped embossed portion defining a spent refrigerant outlet passageway connecting the tops of the top header chambers, a single refrigerating inlet tube communicating with said manifold and a single exhaust tube communicating with said U-shaped passageway.

6. In an evaporator structure including sheet metal formed to provide a freezing chamber and embossed to provide refrigerant circulating ducts together with a header chamber communicating with said ducts, the improvement which comprises an embossed flute on said sheet metal defining a spent refrigerant outlet passageway from the top of said header chamber to the bottom of the evaporator unit.

7. In a sheet metal evaporator unit formed from a pair of brazed-together embossed metal sheets defining U-shaped refrigerant-circulating ducts and header chambers communicating with the ends of said ducts, the improvement which comprises a further embossed portion on at least one of said sheets defining a U-shaped passageway connecting the tops of said header chambers, and an exhaust tube communicating with said passageway at a point remote from said header chambers whereby refrigerant removed from said header chambers will be completely gasified in said passageway before reaching said exhaust tube.

8. An evaporator comprising contiguous metal sheets, one of said sheets having an embossed portion thereon defining a wall for a header chamber, the other of said sheets having an embossed portion thereon defining a pocket, and a metal reinforcing plate between the sheets defining another wall for the chamber to close the chamber, said reinforcing plate being seated in said pocket.

9. An evaporator unit comprising secured-together inner and outer contiguous metal sheets enclosing a sharp freezing chamber and being embossed to provide refrigerant circulating passageways around the chamber, said outer sheet being further embossed to provide a semi-cylindrical header chamber at the top ends of said passageways and communicating with the passageways, said inner sheet being embossed adjacent each semi-cylindrical header chamber to define pockets and a metal reinforcing plate in each pocket to provide a flat solid wall for each header chamber.

10. An evaporator unit comprising secured-together inner and outer contiguous U-shaped metal sheets having embossed portions defining U-shaped refrigerant circulating ducts and a pair of superimposed headers at each end of said ducts, a shelf bridging the side walls of said inner sheet in spaced relation from the bottom wall, means securing said shelf to said side walls in intimate thermal contact therewith, a pair of spaced upturned flanges on the rear end of said shelf and a downturned flange between the upturned flanges on said shelf, said flanges acting as stops at the rear end of the shelf for articles disposed on the shelf or on the bottom wall of said inner sheet.

11. In a sheet metal evaporator unit having inner and outer contiguous U-shaped metal sheets defining therebetween U-shaped refrigerant circulating ducts and header chambers at the top ends of said ducts, the improvements which comprise a second header chamber in each side wall of the unit above said first mentioned header chamber and each having a cylindrical body portion and a convergent conical end portion extending beyond the end of the adjacent lower header chamber.

12. An evaporator unit comprising inner and outer contiguous secured-together metal sheets defining refrigerant circulation ducts and header chambers communicating with the ducts, an embossed flute on one sheet connecting the tops of the header chambers, an exhaust tube communicating with said flute, and an inlet tube communicating with said ducts to supply refrigerant thereto whereby refrigerant will flow through the ducts to the header chambers and spent refrigerant will flow from the header chambers through the flute to the exhaust tube.

13. A sheet metal U-shaped evaporator unit comprising a pair of secured-together contiguous metal sheets, said sheets being embossed to define a pair of superimposed intercommunicating header chambers extending transversely along each leg of the unit, said outer sheet being further embossed to define a plurality of spaced parallel refrigerant circulating ducts connecting the lower header chamber of the pair in one leg to the corresponding header chamber in the other leg, and at least one of said sheets being further embossed to define a spent refrigerant outlet passageway connecting the upper portion of the upper one of the pair of headers in one leg to the upper portion of the corresponding header in the other leg.

14. In a sheet metal evaporator formed from a pair of embossed secured-together contiguous U-shaped metal sheets defining U-shaped refrigerant circulating ducts and a pair of superimposed header chambers at each end of said ducts, the improvement which comprises an embossed flute on the outer sheet connecting the tops of the top header chambers, a domed portion at the bottom wall of the unit above a portion of said flute and communicating therewith, and an exhaust tube extending into said domed portion.

15. A sheet metal evaporator, said evaporator being substantially U-shaped and having transverse passages in its bottom and sides for the circulation of refrigerant, said passages terminating in headers elevated on said sides, and an outlet passage formed in said sides and bottom joining said headers.

16. A U-shaped sheet metal evaporator having an inlet opening, a refrigerant inlet tube associated with said opening, passages for the circulation of refrigerant through said evaporator, means for drawing off refrigerant vapor from said passages including a suction passage formed in the bottom and sides of said evaporator, and a suction tube attached to said evaporator and constructed and arranged to draw vapor upwardly from said suction passage.

BERNARD C. JOHNSON.